(12) United States Patent
Ulmer et al.

(10) Patent No.: US 11,535,740 B2
(45) Date of Patent: Dec. 27, 2022

(54) TABLET COMPOSITIONS CONTAINING CROSSLINKED POLYVINYLPYRROLIDONE AND THEIR USE IN BEVERAGE APPLICATIONS

(71) Applicant: Boai NKY Medical Holdings Ltd., Jiaozuo (CN)

(72) Inventors: Herbert Wilhelm Ulmer, Bussum (NL); Jianqiang Wang, Tianjin (CN); Xiwen He, Tianjin (CN)

(73) Assignee: Boai NKY Medical Holdings Ltd., Jiaozuo (CN)

( * ) Notice: Subject to any disclaimer, the term of this patent is extended or adjusted under 35 U.S.C. 154(b) by 893 days.

(21) Appl. No.: 16/339,522

(22) PCT Filed: Oct. 5, 2016

(86) PCT No.: PCT/CN2016/101428
§ 371 (c)(1),
(2) Date: Apr. 4, 2019

(87) PCT Pub. No.: WO2018/064795
PCT Pub. Date: Apr. 12, 2018

(65) Prior Publication Data
US 2020/0040176 A1  Feb. 6, 2020

(51) Int. Cl.
| | |
|---|---|
| *C08L 39/06* | (2006.01) |
| *A23L 2/70* | (2006.01) |
| *B01J 20/26* | (2006.01) |
| *B01J 20/28* | (2006.01) |
| *C08K 3/04* | (2006.01) |
| *C08K 3/34* | (2006.01) |
| *C08K 3/36* | (2006.01) |
| *C08K 7/02* | (2006.01) |
| *C12H 1/14* | (2006.01) |
| *C12H 1/04* | (2006.01) |

(52) U.S. Cl.
CPC .................. *C08L 39/06* (2013.01); *A23L 2/70* (2013.01); *B01J 20/267* (2013.01); *B01J 20/28042* (2013.01); *C08K 3/04* (2013.01); *C08K 3/346* (2013.01); *C08K 3/36* (2013.01); *C08K 7/02* (2013.01); *C12H 1/14* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 5,484,620 A | * | 1/1996 | Oechsle | B01J 20/22 264/117 |
| 2003/0032574 A1 | | 2/2003 | Meffert et al. | |
| 2011/0257158 A1 | * | 10/2011 | Moschwitzer | A61K 9/2027 514/212.07 |
| 2011/0281732 A1 | | 11/2011 | Mola et al. | |

FOREIGN PATENT DOCUMENTS

| | | |
|---|---|---|
| WO | 9420555 A1 | 9/1994 |
| WO | 9937308 A1 | 7/1999 |
| WO | 2009051958 A1 | 4/2009 |
| WO | 2010065603 A1 | 6/2010 |
| WO | 2010070057 A2 | 6/2010 |
| WO | 2012011806 A1 | 1/2012 |

OTHER PUBLICATIONS

Jun. 2, 2020 (EP)—Extended European Search Report Application No. 16918129.4.
Kornblum, Saul S. et al. "A New Tablet Disintegrating Agent: Cross-Linked Polyvinylpyrrolidone" Journal of Pharmaceutical Sciences, vol. 62, No. 1, Jan. 31, 1973 (Jan. 31, 1973), ISSN: 1520-6017, p. 44, right column "Tablet Preparation for Dissolution Rate Studies", Table II.

* cited by examiner

*Primary Examiner* — Daniel Berns
(74) *Attorney, Agent, or Firm* — Banner & Witcoff, Ltd.

(57) ABSTRACT

Provided are crosslinked polyvinylpyrrolidone (PVPP) compositions and their use in beverage treatment. Provided is a dry, direct compressed tablet comprising at lease 70 wt % crosslinked PVPP. Also provided is the use of said tablet for the filtering and/or removing polyphenol of a liquid, preferable a beverage.

12 Claims, No Drawings

TABLET COMPOSITIONS CONTAINING CROSSLINKED POLYVINYLPYRROLIDONE AND THEIR USE IN BEVERAGE APPLICATIONS

RELATED APPLICATIONS

This application is a National Stage Application under 35 U.S.C. 371 of co-pending PCT application PCT/CN2016/101428 designating the United States and filed Oct. 5, 2016 and is hereby incorporated herein by reference in its entirety for all purposes.

The invention relates to the production of direct compression tablets consisting solely or primarily of crosslinked polyvinylpyrrolidone and their use in beverage treatment. The crosslinked polyvinylpyrrolidone tablets possess improved handling and storage characteristics as compared to their powder counterparts. Specifically, packaging efficiency is improved while the risk of moisture uptake and dusting is greatly reduced, offering the end-user a more desirable product.

Crosslinked polyvinylpyrrolidone (PVPP) is a water-insoluble, water-swellable, hydrophilic polymer having multiple use applications. In the area of pharmaceuticals, the crosslinked PVPP powders, having the generic reference of crospovidone, are used as disintegrants in tableting applications and dispersants in solution/oral applications. In the beverage industry, PVPP is added as a filtering aid where it binds and removes unwanted polyphenols that can cause undesirable flavor attributes and/or hazing.

The basic process to make PVPP is by the base-catalyzed "popcorn" polymerization of N-vinylpyrrolidone as outlined in U.S. Pat. No. 2,938,017. Either the crosslinker is made "in-situ" or added during the polymerization reaction. The resultant insoluble PVPP is then generally washed, dried, milled and segregated into specific powder sizes before selling to the customer. The reason for offering various powder sizes to the customer is that it is known that the adsorptive capacity of commercial PVPP's is related to the particle size. The research conducted by McMurrough et al (J. Agricultural Food Chem., 43, 10, 2687-2691, 1995) showed that polyphenol adsorption increased for decreasing particle size. However, since PVPP is added as a filtering aid and must be removed during the filtration process, some customers still require larger particle size PVPP so they can adequately process their filtrate streams.

Various sized PVPP powders are sold by multiple manufacturers and include the tradenames: PolyFilter® available from Boai NKY Pharmaceuticals Ltd, (Henan, China), Polyclar® available from Ashland Inc. (Covington, Ky., USA) and Divergen® available from BASF Corp. (Ludwigshafen, Germany). Though PVPP powders have shown to be excellent polyphenol scavengers and are used extensively in beverage production, the powders possess some undesirable handling issues, specifically the potential for heavy dusting during the transfer of the PVPP powders. In addition, fine powders of PVPP are not readily flowable, have the tendency to absorb moisture and possess low bulk densities.

There have been attempts to manufacture and supply a more "user friendly" PVPP product to the customer. U.S. Pat. No. 3,878,310 outlines the synthesis of insoluble porous polyvinylpyrrolidone granules and beads. These porous beads are synthesized by the addition of an external cross-linker while undergoing suspension polymerization. Though the resultant material looks interesting, the unknown toxicity of the resultant materials limits its commercial viability. International patent WO 2010/065603 outlines the process to make PVPP granules to overcome the issue of dusting. The process requires two steps: a compression step to form the coherent mass and a "breaking step" to break up the compressed composition into discrete pieces. The resultant granules are in the size range of about 200-1000 microns. This two-step process is less than ideal from a cost standpoint. In addition, the "breaking step" has the potential to further damage the PVPP microstructure giving undesirable filtrate characteristics. In addition, it seems that the granulation process can negatively affect the polyphenol removal capacity of the granulated PVPP as compared to the original powder as indicated by the reference "granulated compositions retain 80% or more of the original polyphenol removal of the ungranulated feedstock".

Quite unexpectedly, it has been found that the crosslinked PVPP powders can undergo direct compression to form tablets having minimal dusting and acceptable mechanical characteristics. Though PVPP is generally considered a disintegrant, it also possesses binder properties that allow it to undergo direct compression without the need for addition of other tableting ingredients. The resultant tablets formed show excellent flowability, reduced dusting, reduced moisture uptake and a higher bulk density. The reduced moisture uptake and higher bulk density makes packaging/shipping more efficient as compared to the corresponding PVPP powders.

Accordingly, the invention provides a dry, direct compressed tablet comprising at least 70 wt % crosslinked polyvinylpyrrolidone (PVPP). Preferably, the tablet comprises at least 85 wt %, more preferably at least 95% crosslinked PVPP.

When these tablets are placed in the beverage to be treated, the disintegration properties of PVPP cause the tablets to quickly disintegrate to give the original powder PVPP. There is no difference in polyphenol absorption capacity observed for the PVPP tablets and original PVPP powder. In addition, because there is no "breaking step" after the tablet is formed, the resultant PVPP microstructure is not effected in anyway and there is no concern that the beverage filtrate containing the tableted PVPP is any different than if the powder was used. Treated beverages can be both aqueous and hydro-alcoholic based and include for example beer, wine, tea, fruit juice, vinegar and vegetable extracts.

It should be known that the size of the PVPP powder does have an effect on dissolution rates. Larger particle size PVPP will swell and disintegrate more quickly than fine particle size PVPP. Relatively short disintegration times are preferred for the tablets to convert to the free powder when placed in aqueous or hydro-alcoholic solutions. The main reason for this is so that the PVPP tablets this do not negatively effect the overall process time. Dissolution times of less than 10 minutes, preferably less than 5 minutes are desired. Thus, an additional advantage of the present invention is that the dissolution rate and polyphenol sorption capacity of the resultant PVPP tablets can be "fine-tuned" depending on the original powder characteristics of the PVPP used. In one embodiment, PVPP powders having a mean particle size of between 1 to 600 microns is used to compress the tablets, for example 1 to 500 microns, or 5 to 400 microns. A mean particle size range of 10 to 300 microns is particularly preferred. In a specific aspect, the mean particle size is about 20, 30, 40, 50, 70, 80, 100 or 150 microns.

A tablet according to the invention can have any desirable size or dimension. Preferred are tablets having a diameter of at least 5 mm, more preferably at least 10 mm.

In a specific aspect, a tablet according to the invention consists essentially only of PVPP, for example at least 95 wt %, 96 wt %, 97 wt %, 98 wt % or 99 wt % is PVPP. Tablets consisting of 100 wt % crosslinked PVPP are also provided. However, it should also be clear that other ingredients, e.g. filtering aid chemicals typically used in the field of beverage treatment, can be "co-tableted" with the PVPP to make customized tablet compositions. It will be apparent to a person skilled in the art that by adjusting the grade of PVPP used and the ratio of PVPP with other filtering aid chemicals, a broad range of PVPP containing tablet formulations can be produced that meets the customer's specific application needs.

Such filtering aid co-ingredients include, but are not limited to: activated carbon, silicas, bentonite clays, carrageenans, polysaccharides, cellulose fibers, diatomaceous earth and mixtures thereof. The beverage use application for such tablets include, but are not limited to: beers, wines, fruit juices, vinegars, vegetable extracts and teas.

Also provided is a container comprising a plurality of compressed PVPP tablets of the invention. Preferably, the container is suitable for packing, storing and/or transporting tablets in large quantities. The tablet containers may be manufactured using superior quality plastic material, which has food drug approved grades.

All of the compositions, methods and experiments disclosed and claimed herein can be made and executed without undue experimentation in light of the present invention. While the compositions, methods and experiments of this invention have been described in terms of preferred embodiments, it will be apparent to those skilled in the art that variations may be applied to the compositions and methods and in the steps or in the sequence of steps of the method described herein without departing from the concept, spirit and scope of the invention. All modifications and applications apparent to those skilled in the art are deemed to be within the spirit, scope and concept of the invention as defined in the appended claims.

EXPERIMENTAL SECTION

Example 1: Direct Compression to Form PVPP Tablets

Tablets of PVPP were formed from commercial crosslinked PVPP powder (PolyFilter® 10) having a mean particle size distribution of about 30 microns by direct compression. The details of the actual conditions are outlined in Table 1. As can be seen from the table, acceptable tablet properties are observed for all tableting conditions. All tablet samples show quick dissolution/disintegration time in aqueous solution of less than 3 minutes. After disintegration, the resultant PVPP powder characteristics are the same as in the original powder PVPP material.

TABLE 1

|  | Tablet sample 1 | Tablet sample 2 | Tablet sample 3 |
|---|---|---|---|
| Tableting machine: |  |  |  |
| Slugging thickness (mm) | 4 | 7 | 10 |
| Filling depth (mm) | 7 | 9 | 14 |
| Sheet thickness (mm) | 3 | 6 | 9 |
| Piece diameter (mm) | 10 | 22 | 30 |
| Compression force (KN) | 30 | 35 | 48 |

TABLE 1-continued

|  | Tablet sample 1 | Tablet sample 2 | Tablet sample 3 |
|---|---|---|---|
| Resultant tablet properties: |  |  |  |
| Tablet hardness (N) | 70 | 75 | 75 |
| Tablet weight (mg) | 420 | 1500 | 3300 |
| Disintegration time (min) | 2'30" | 2'45" | 2'40" |
| Friability (%) | 0.3 | 0.6 | 0.9 |

Tablets made under the same tableting conditions as outlined in Table 1 using commercial crosslinked PVPP powder (PolyFilter® XL) having mean particle size of 100 microns resulted in dissolution times in aqueous solution ranging from 2 to 2' 30" minutes.

Example 2: Polyphenol Adsorption in Beer Treated with PVPP Powders and Tablets

Both the original PVPP powder and the dry, compressed PVPP tablets of the invention were used to treat beer at various PVPP feed concentrations. Both the powder and tablets utilized commercial PVPP powder (PolyFilter® 10) having a mean particle size of about 30 microns. The resultant table gives the summary of the feed rates and resultant polyphenol levels in the beer after treatment. As can be seen from Table 2, there is no difference in the resultant polyphenol concentration for the original PVPP powder and the PVPP tablet of the present invention. Thus, the resultant PVPP tablets have a similar polyphenol adsorption capacity as compared to the original PVPP powder.

TABLE 2

|  | PVPP feed concentration (ppm) | | | | |
|---|---|---|---|---|---|
|  | 0 | 100 | 200 | 300 | 500 |
| PVPP powder (original) |  |  |  |  |  |
| Polyphenol concentration in beer after treatment (mg/L) | 215 | 187 | 170 | 151 | 132 |
| PVPP tablet invention (Direct compression) |  |  |  |  |  |
| Polyphenol concentration in beer after treatment (mg/L) | 217 | 179 | 171 | 150 | 133 |

The invention claimed is:

1. A method for removing polyphenol from a liquid, comprising (i) contacting the liquid with a dry, direct compressed tablet comprising at least 70 wt % crosslinked polyvinylpyrrolidone (PVPP), and (ii) subsequently filtering, settling or centrifuging the liquid to remove the PVPP, wherein the tablet disintegrates within 10 minutes, in an aqueous or hydro-alcoholic solution.

2. The method according to claim 1, wherein said liquid is a beverage.

3. The method according to claim 2, wherein said beverage is a beer, wine, fruit juice, vinegar, vegetable extract or tea.

4. The method according to claim 1 wherein the tablet comprises at least 85 wt % crosslinked PVPP.

5. The method according to claim 1, wherein the mean particle size of said PVPP is in the range between 1 to 600 µm.

6. The method according to claim 1, wherein the tablet has a diameter of at least 5 mm.

7. The method according to claim 1, wherein the tablet consists essentially of PVPP.

8. The method according to claim 1, wherein the tablet comprises PVPP and one or more further ingredients selected from the group consisting of activated carbon, silicas, bentonite clays, carrageenans, polysaccharides, cellulose fibers, diatomaceous earth and mixtures thereof.

9. The method according to claim 1, wherein the tablet comprises at least 95% crosslinked PVPP.

10. The method according to claim 1, wherein the mean particle size of said PVPP is in the range between 10 to 300 μm.

11. The method according to claim 1, wherein the tablet has a diameter of at least 10 mm.

12. The method according to claim 1, wherein the tablet disintegrates within 5 minutes, in an aqueous or hydro-alcoholic solution.

\* \* \* \* \*